(12) United States Patent
Rajpoot et al.

(10) Patent No.: US 12,526,723 B2
(45) Date of Patent: Jan. 13, 2026

(54) SYSTEMS AND METHODS FOR SERVICE GAP MITIGATION VIA TILT RECOMMENDATION

(71) Applicant: Rakuten Symphony, Inc., Tokyo (JP)

(72) Inventors: Atul Rajpoot, Indore (IN); Nilesh Bankar, Indore (IN); Durgesh Rathore, Indore (IN); Sudeep Kumar Jain, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 343 days.

(21) Appl. No.: 18/016,718

(22) PCT Filed: Dec. 20, 2022

(86) PCT No.: PCT/US2022/053469
§ 371 (c)(1),
(2) Date: Jan. 18, 2023

(87) PCT Pub. No.: WO2024/136848
PCT Pub. Date: Jun. 27, 2024

(65) Prior Publication Data
US 2025/0097817 A1    Mar. 20, 2025

(51) Int. Cl.
*H04W 40/20* (2009.01)
*H04W 16/28* (2009.01)
*H04W 24/04* (2009.01)

(52) U.S. Cl.
CPC ......... *H04W 40/205* (2013.01); *H04W 16/28* (2013.01); *H04W 24/04* (2013.01)

(58) Field of Classification Search
CPC ....... H04W 64/00; H04W 88/06; H04W 4/02; H04W 4/38; H04W 4/029; H04W 24/00; H04W 24/02; H04W 24/06; H04W 24/08; H04W 24/10
See application file for complete search history.

(56) References Cited

U.S. PATENT DOCUMENTS

| | | | | |
|---|---|---|---|---|
| 6,580,911 B1 * | 6/2003 | Clancy | ................... | H04W 16/18 455/448 |
| 7,035,632 B2 * | 4/2006 | Gutowski | ............. | H04W 24/00 455/67.11 |
| 7,718,654 B2 * | 5/2010 | Martyres | ................. | A61P 25/24 544/118 |

(Continued)

FOREIGN PATENT DOCUMENTS

WO     WO-2016026531 A1 *  2/2016  ............ H04W 24/02

OTHER PUBLICATIONS

International Search Report issued Apr. 12, 2023 in International Application No. PCT/US22/53469.

(Continued)

*Primary Examiner* — Kharye Pope
(74) *Attorney, Agent, or Firm* — Sughrue Mion, PLLC

(57) ABSTRACT

A method for service gap mitigation via tilt recommendation may include: identifying a candidate cell; generating boundaries of a service gap; determining a best server plot of the candidate cell; determining geo-located samples of the candidate cell; categorizing the candidate cell based on the boundaries of the service gap and at least one of the best server plot or the geo-located samples; and calculating an electronic tilt based on the categorization.

17 Claims, 14 Drawing Sheets

(56) References Cited

U.S. PATENT DOCUMENTS

| | | |
|---|---|---|
| 8,718,654 B2 | 5/2014 | Power et al. |
| 9,271,157 B2 * | 2/2016 | Pollard ................. H04W 16/24 |
| 10,039,064 B1 * | 7/2018 | Gibbons ................ H04H 20/71 |
| 2007/0135170 A1 * | 6/2007 | Khan ................... H04B 7/0491 |
| | | 455/562.1 |
| 2010/0091746 A1 * | 4/2010 | Li ......................... H04W 24/04 |
| | | 370/338 |
| 2010/0112996 A1 * | 5/2010 | Ho ........................ H04W 16/28 |
| | | 455/419 |
| 2011/0212720 A1 * | 9/2011 | Hamalainen ........ H04L 41/0677 |
| | | 455/423 |

OTHER PUBLICATIONS

Written Opinion issued Apr. 12, 2023 in International Application No. PCT/US22/53469.

* cited by examiner

Service Gap Properties

Displaying 0 of 0 | Polygon Information ▽ — 730

| Service Gap ID | Area (Sq. Km) | Morphology | No of optimization.... | Polygon Priority | Avg. RSRP dBm | Area Covered by Candidate Cells... |
|---|---|---|---|---|---|---|
| TC5550D1_2911C | 115697.0 | SubUrban | 2 | P2 | -105.50 | 98.45 |
| 702 | 704 | 706 | 708 | 710 | 712 | 714 |

Service Gap Properties

Displaying 0 of 0 | Candidate Cells ▼ | | System Recommendations ▼

| Cell Name | Selection Criteria | Current E-Tilt | Proposed E-Tilt |
|---|---|---|---|
| RNA0901000071-10 | Best Server Plot | 4 | 3 |
| RNA0901000045-10 | Best Server Plot | 4 | 3 |

FIG. 7B ized to cause at least one of the at least one processor to calculate an electronic tilt based on the categorization.

According to an embodiment, a non-transitory computer-readable recording medium has recorded thereon a program configured to cause a computer to: identify a candidate cell; generate boundaries of a service gap; determine a best server plot of the candidate cell; determine geo-located samples of the candidate cell; categorize the candidate cell based on the boundaries of the service gap and at least one of the best server plot or the geo-located samples; and calculate an electronic tilt based on the categorization.

SYSTEMS AND METHODS FOR SERVICE GAP MITIGATION VIA TILT RECOMMENDATION

CROSS REFERENCE TO RELATED APPLICATIONS

This application is a National Stage of International Application No. PCT/US2022/053469 filed Dec. 20, 2022.

1. Field

Systems and methods consistent with example embodiments relate generally to mitigating service gaps in network coverage via tilt recommendation.

2. Description of Related Art

A network area may include service gaps that have poor network coverage or no network coverage. Service gaps downgrade the overall quality and performance of the network, and are a cause of dissatisfaction for network users or customers of a telecommunications operator. Thus, eliminating or mitigating the negative impact caused by service gaps is important in order to provide reliable and high-quality network performance. Related art systems have failed to provide efficient solutions for mitigating service gaps. For example, related art systems have failed to provide an effective algorithm to accurately ascertain a correct tilt to reduce a service gap. Accordingly, there exists a need for improved processes for mitigating service gaps.

SUMMARY

According to embodiments, systems and methods are provided for generating information related to tilt recommendations, which may be used to mitigate service gaps thereby improving the reliability and quality of network performance.

According to an embodiment, a method for generating information related to tilt recommendations includes: identifying a candidate cell: generating boundaries of a service gap: determining a best server plot of the candidate cell: determining geo-located samples of the candidate cell: categorizing the candidate cell based on the boundaries of the service gap and at least one of the best server plot or the geo-located samples; and calculating an electronic tilt based on the categorization.

According to an embodiment, an information processing system includes: at least one memory configured to store computer program code; and at least one processor configured to access said at least one memory and operate as instructed by said computer program code, said computer program code including: identifying code configured to cause at least one of the at least one processor to identify a candidate cell, generating code configured to cause at least one of the at least one processor to generate boundaries of a service gap, first determining code configured to cause at least one of the at least one processor to determine a best server plot of the candidate cell, second determining code configured to cause at least one of the at least one processor to determine geo-located samples of the candidate cell, categorizing code configured to cause at least one of the at least one processor to categorize the candidate cell based on the boundaries of the service gap and at least one of the best server plot or the geo-located samples, and calculating code config- Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIGS. 7A and 7B respectively show a GUI after selection of a polygon information option and a system recommendation option, according to an example embodiment.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
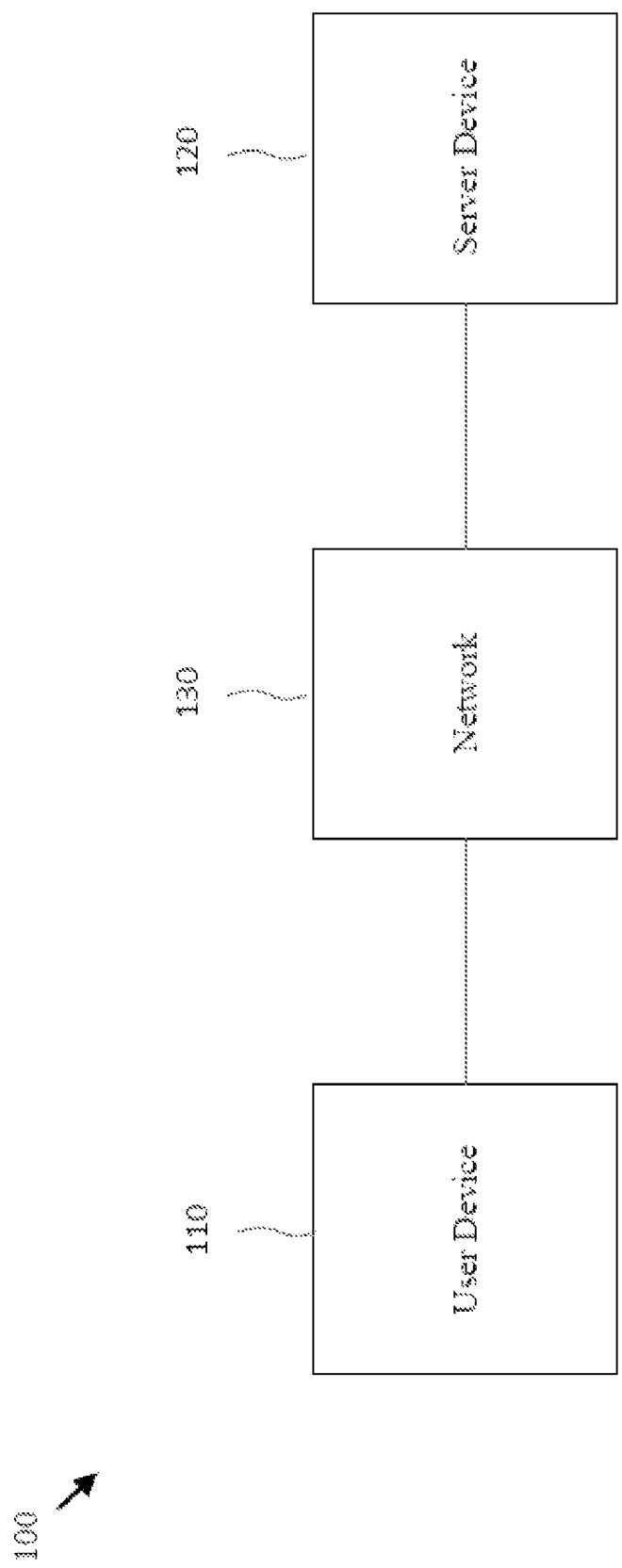
FIG. 1 is a diagram of a system according to an embodiment.

FIG. 1 is a diagram of a system according to an embodiment. FIG. 1 includes a user device 110, a server device 120, and a network 130. The user device 110 and the server device 120 may interconnect via through the network 130 providing wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
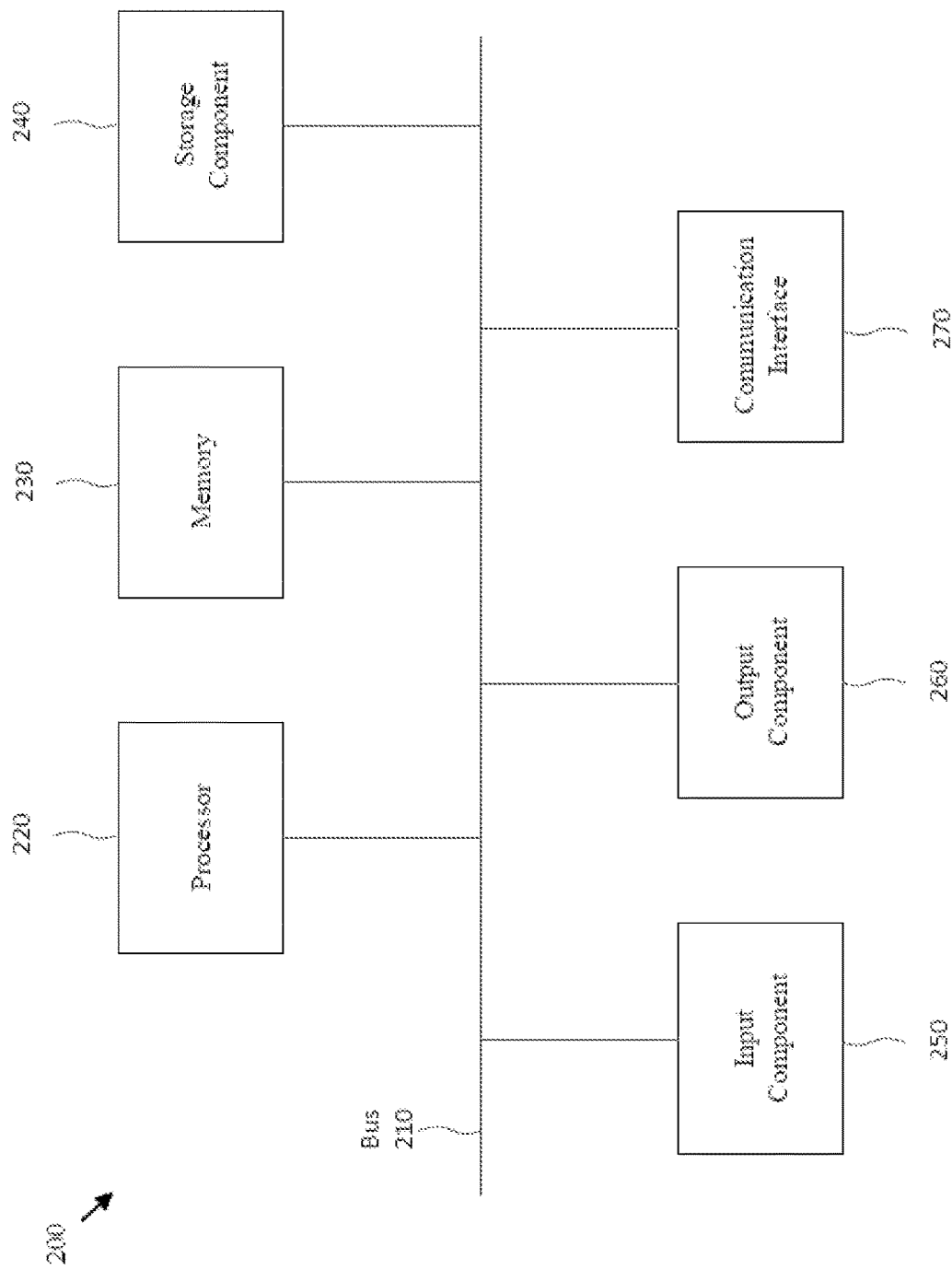
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided as disclosed herein are systems, methods, and devices configured to mitigate or eliminate service gaps in a telecommunications network via a tilt recommendation. Specifically the methods, systems, and devices provide a way to easily recommend one or more modifications to tilt parameters, which may be used to address a particular service gap.

"Service gap" and "service gap polygon" may be used interchangeably herein and may refer to a polygon generated over a smart network coverage layer, which shows one or more polygonal areas of poor coverage in the network. The systems, methods and devices may generate service gap polygons for each band periodically and provide optimization suggestions to improve the coverage, and after the optimization suggestions are implemented, tracking the improvements of the service gaps. In some embodiments, optimization suggestions may include one or more tilt recommendations.

First, a service gap may be identified. The identified service gap may be referred to as a service gap of interest. One or more service gaps may be identified by generating service gap polygons for each band. The generation of service gaps may occur on a reoccurring basis, e.g., periodically. When identifying service gaps, the system may utilize various inputs. One input may include a unified coverage layer. A unified coverage layer may be a smart layer generated by superimposing planning prediction data and live test data, and collecting samples from users. An updated band-wise unified coverage layer may be present. Another input may include a site database. The site database may store information for all sites in the network, including information on a latitude, a longitude, an azimuth, band details, on air status, on air date, base station (e.g., eNB) identifier (ID), an evolved universal terrestrial access network (E-UTRAN) cell global identifier (ECGI), antenna height, electrical tilt, mechanical tilt, transmission power, reference signal receive power (RSRP), etc. While the site database may include existing sites, the site database may further include sites under consideration for construction, or new sites that have been recommended. Therefore, the types of sites included in the site database is not particularly limited.

Other inputs may include clutter data, which includes information on area morphology (i.e., density of users or accesses), boundaries, which may include radio frequency (RF) cluster and region boundaries, a best server plot, which predicts coverage of a site calculated during a planning phase (e.g., generated from a prediction tool for on air sites), geo-location data, which may be collected using drive test tools such as net velocity, and may be passively collected data that has been used for a predetermined amount of time (e.g., 7 days), cell-wise preventative measurement (PM) counter key performance indicators (KPIs) such as call drop rate, radio resource control (RRC) attempts, RRC re-establishment attempts, mean control quality indicator (CQI), etc.

Figure 3A:
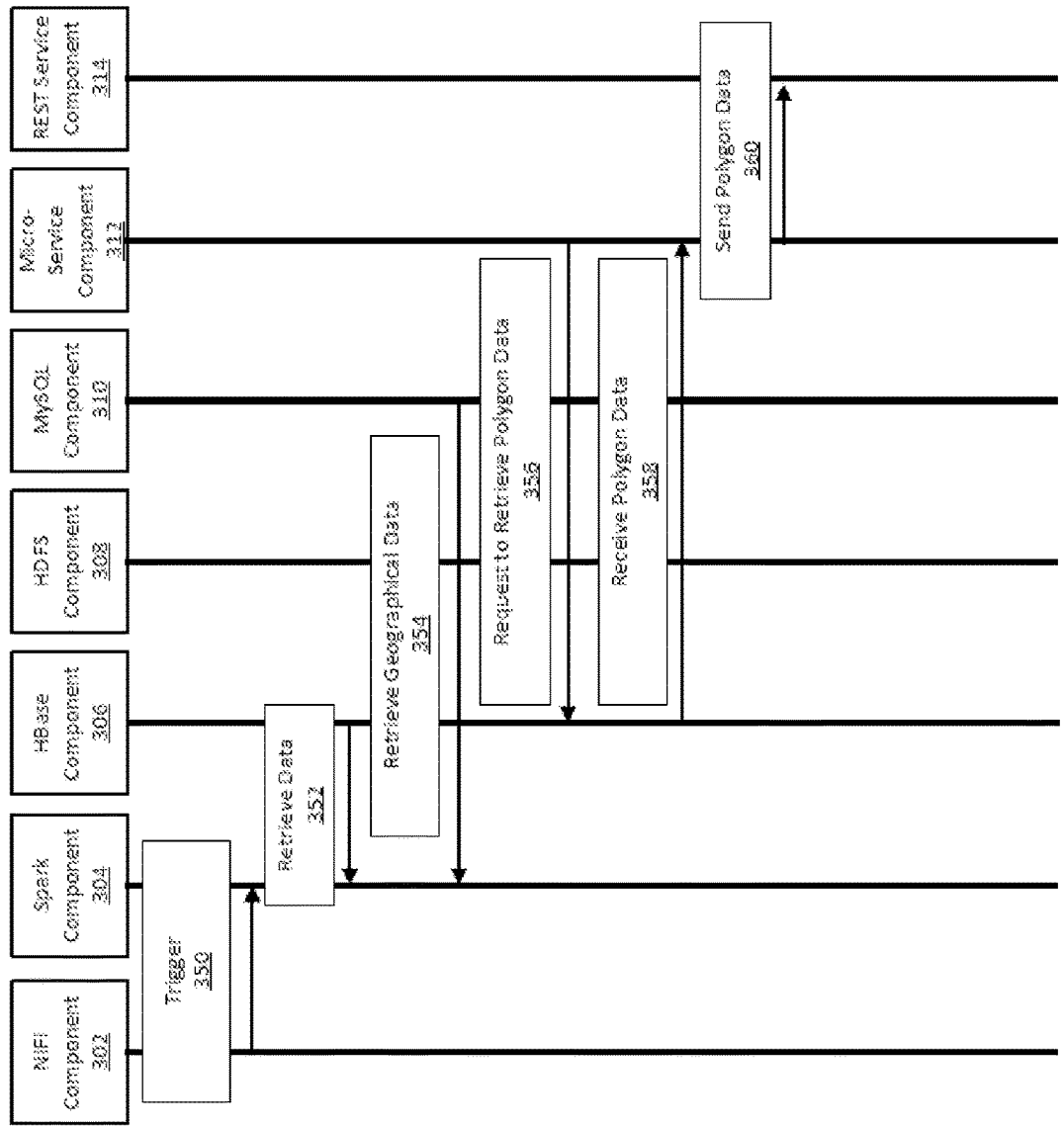
FIGS. 3A and 3B are diagrams of an operation flow of a system for identifying service gaps, according to an example embodiment.
Figure 3B:
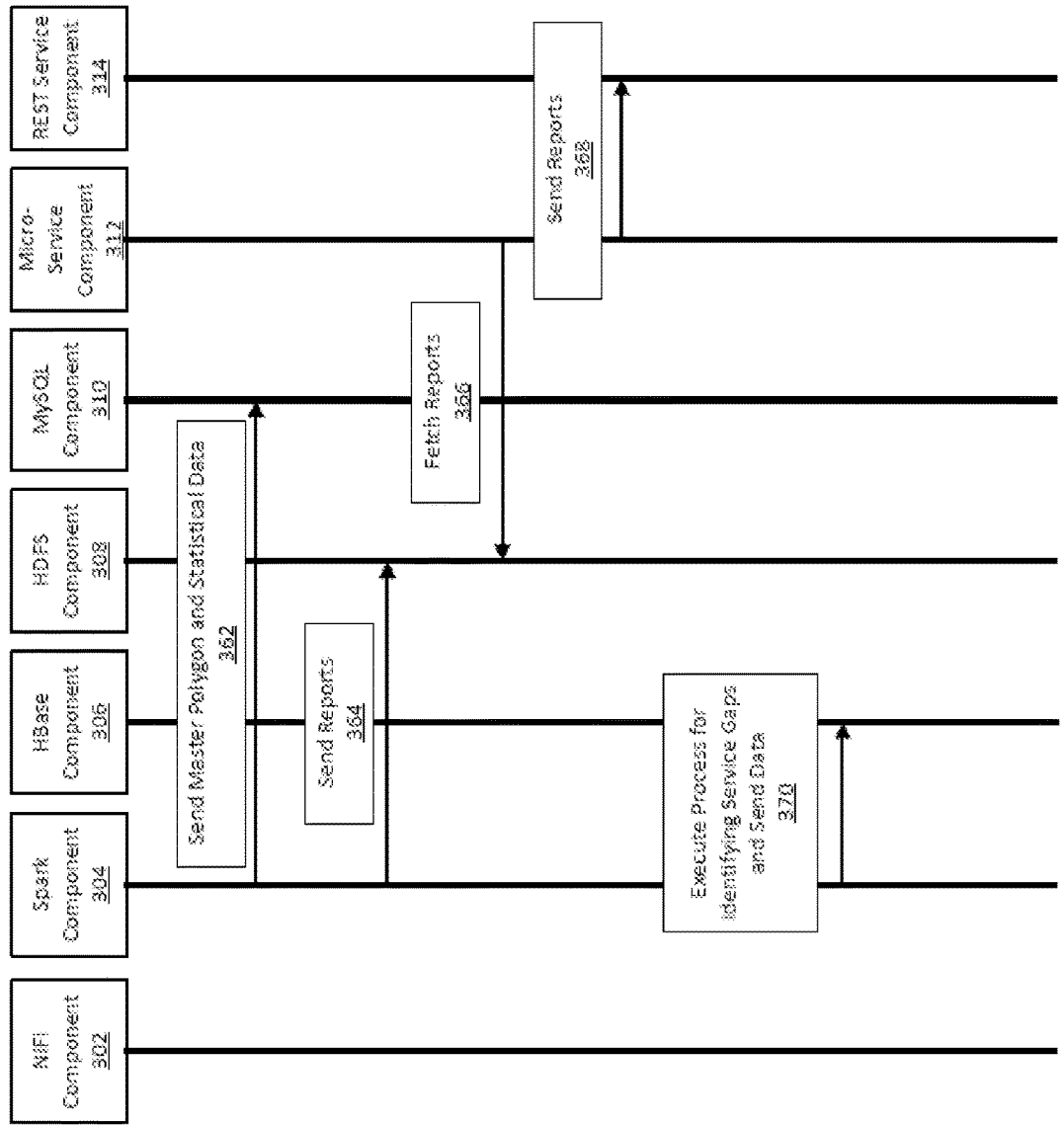

FIGS. 3A and 3B are diagrams of an operation flow of a system for identifying service gaps, according to an example embodiment. The system may include a NiFi component 302, a spark component 304, and HBase component 306, a Hadoop distributed file system (HDFS) component 308, a MySQL component 310, a micro-service component 312, and a representational state transfer (REST) service component 314.

The NiFi component 302 may include a software design that is based on a flow-based programming model and offer features that prominently include the ability to operate within clusters. The NiFi component 302 may be used to ingest streaming data from third-party applications such as Boomer Cell Identification data from various enhanced messaging service (EMS) applications.

The spark component 304 may include a parallel processing framework for running large-scale data analytics applications across clustered computers. The spark component 304 may handle both batch and real-time analytics and data processing workloads.

The HBase component 306 may include a column-oriented non-relational database management system that runs on top of an HDFS. The HBase component 306 may provide a fault-tolerant way of storing sparse data sets.

The HDFS component 308 may be configured for storage of all the raw data that the system uses. All batched data sources may be initially stored into the HDFS component 308 and then processed using the spark component 304. The HBase component 306 may also use the HDFS component 308 for its data storage infrastructure.

The MySQL component 310 may be configured for storage of processed data in the framework. The MySQL component 310 may be utilized for application programming interface (API) retrieval and for serving any real-time user interface (UI) requirements. The aggregated and correlated data may also be stored in the MySQL component 310.

The micro-service component 312 may be configured as an architectural style that structures an application as a collections of services that are highly maintainable and testable. The micro-service component 312 may be loosely coupled, independently deployable, and organized around business capabilities.

The REST service component 314 may be a service that conforms to a representational state transfer (REST) architecture.

In operation 350, the system triggers the spark component 304, with the NiFi component 302 to initiate the process of identifying service gaps. In operation 352, the spark component 304 retrieves data from the HBase component 306, such as the inputs described above. In operation 354, the spark component 304 retrieves geographical and site data from the MySQL component 310. In operation 356, the micro-service component 312 sends a request to the HBase component 306 to retrieve polygon data. In operation 358, the HBase component 306 transmits the requested polygon data to the micro-service component 312. In operation 360, the micro-service component 312 sends the retrieved polygon data to the REST service component 314 for visualization of the polygon data. In operation 362, the spark component 304 sends the master polygon and statistical data generated from the retrieved data (e.g., the inputs) to the MySQL component 310. In operation 364, the spark component 304 sends reports generated based on the retrieved data to the HDFS component 308 for storage. In operation 366, the micro-service component 312 fetches reports from the HDFS component 308. In operation 368, the micro-service component 312 sends the reports to the REST service component 314 for visualization (e.g., generating a map showing the service gaps or overlaying service gaps on an existing map). In operation 370, the spark component 304 executes the process for identifying service gaps (e.g., generating updated service gaps) at a predefined time interval (e.g., daily, weekly, etc.) and sends the data to the HBase component 306.

Figure 4:
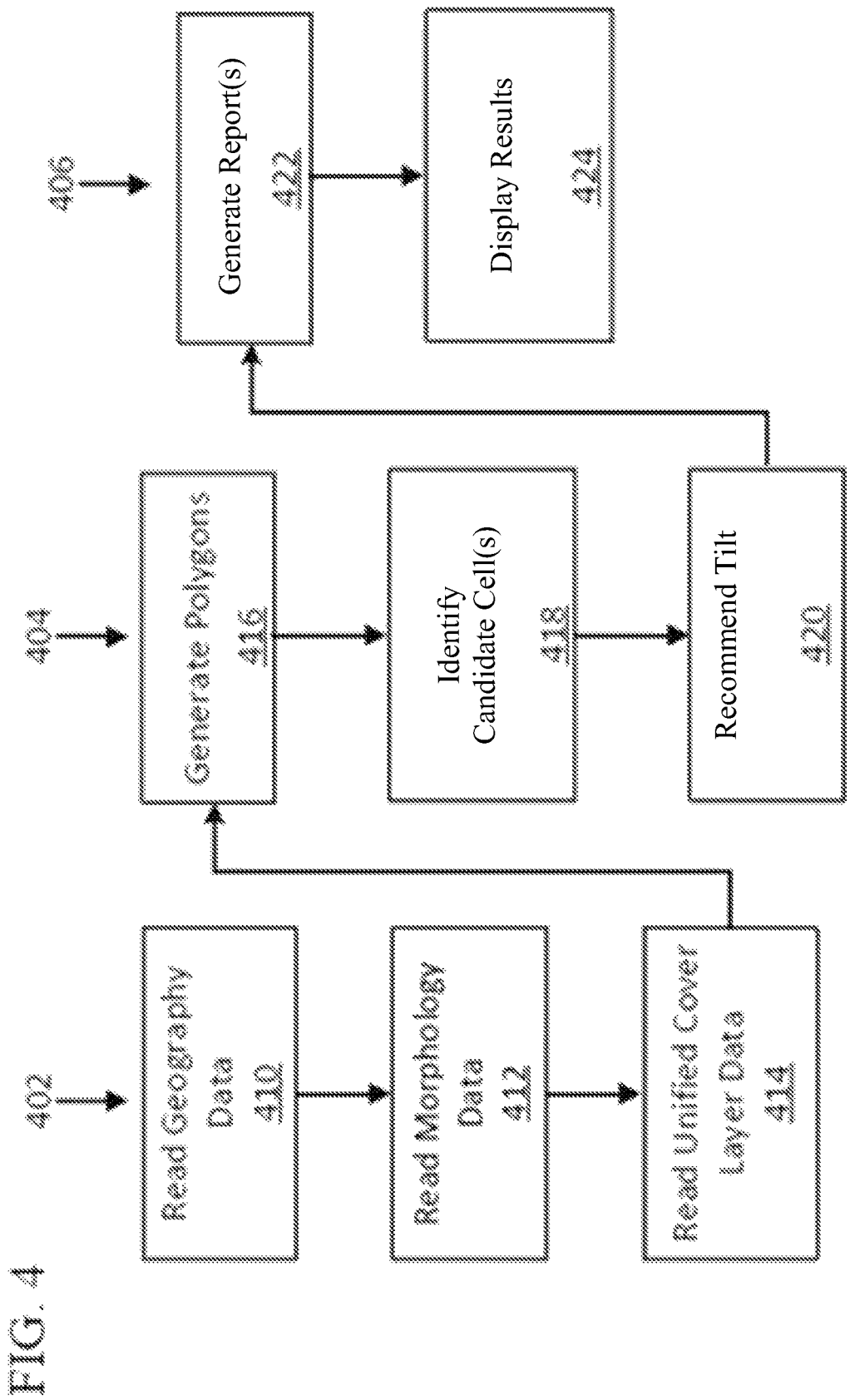
FIG. 4 is a diagram of an overall process of mitigating or eliminating service gaps in a telecommunications network via tilt recommendations, according to an example embodiment.

FIG. 4 is a diagram of an overall process of mitigating or eliminating service gaps in a telecommunications network via tilt recommendations, according to some embodiments. The process may include sub-processes such as an input retrieval sub-process 402, a tilt recommendation sub-process 404, and a representation sub-process 406.

In operation 410, the system reads geography data. In operation 412, the system reads morphology data. In operation 414, the system reads unified coverage layer data. In operation 416, the system generates polygons, e.g., by (1) joining the unified coverage layer data and the geography data: (2) joining the morphology data and the geography data; and/or (3) performing grouping based on geography. The one or more generated polygons may represent one or more service gaps. In some embodiments, service gaps may be identified and represented using shapes other than polygons. For example, the system may generate any two or three dimensional shape to represent a service gap in the network. The service gaps, which may be in the form of polygons or any other shape, are then stored.

In operation 418, the system identifies candidate cells. In some embodiments, the system identifies candidate cells by one or more of: (1) reading the generated polygons, (2) reading a graphical UI (GUI) generated based on generated reports, (3) reading on air sites, (4) reading a combined parquet from an HDFS, (5) reading Best Server Plot (BSP) information, or (6) identifying BSP and a geolocation sample cell. Reading by the system may relate to, e.g., obtaining, analyzing, or performing operations on data. In some embodiments, first a candidate cell is identified, then a best server plot (BSP) of the candidate cell is generated, calculated, or determined. In some embodiments, BSP relates to a planned area of coverage, and BSP may be used in developing and/or planning a network coverage area. After the system identifies a candidate cell, the system may save or store the candidate cell.

In some embodiments, a best server plot (BSP) of an identified cell is compared to the service gap of interest, and this comparison may be used to determine whether to mitigate or eliminate the service gap via tilt recommendation or another process of mitigating or eliminating the service gap, e.g., (new site recommendation). For example, an amount of overlap of the identified cell's BSP and the service gap area may be calculated or determined. If the amount of overlap is greater than or equal to 50%, a tilt recommendation process may be employed. If the amount of overlap is less than 50%, a new site recommendation process may be employed. While 50% is used as one exemplary threshold, any percentage threshold or other way of determining which service gap mitigation/elimination process or method to use. Also, while a comparison of a candidate cell's BSP to the area of a service gap of interest may be used, in addition or in the alternative, any criteria may be used to determine which and/or how many recommendation methods to employ. In some embodiments, both of the tilt recommendation and new site recommendation processes may be employed, either sequentially or simultaneously.

In operation 420, the system performs a tilt recommendation process according to example embodiments. In some embodiments the system may employ the tilt recommendation process further discussed below with reference to FIGS. 5-7.

In operation 422, the system generates one or more reports, e.g., based on recommendations that could be used to mitigate or eliminate one or more service gaps. In operation 424, the system displays results. In some embodiments, the displayed results are results related to the generated reports regarding the recommendations to mitigate or eliminate one or more service gaps.

The above-noted operations 410 through 424 may be used to accurately ascertain a correct amount of tilt to reduce a service gap or service hole. In related-art technologies, an engineer was required to attempt to manually determine the amount of tilt, and such manual process was error prone and inaccurate. The related art specifically failed to utilize an algorithm to ascertain an accurate tilt amount to mitigate or eliminate the negative effects of a service gap. According to the techniques described herein, an algorithm may be provided that may be used to ascertain an accurate tilt amount to mitigate or eliminate negative effects of a service gap, and such algorithm may use parameters such as morphology, area, a cell height (e.g., a height above mean seal level (AMSL)), etc. Morphology may relate to a clutter type or clutter data, and may involve classifications of land cover and/or land usage data. The clutter type may be defined for telecommunications. In some embodiments, the clutter type may be classified as either dense urban, mid-urban, urban, suburban, or rural urban. The criteria or thresholds used to determine or distinguish between clutter type may be any criteria or thresholds. In some embodiments, a clutter type classification may be a morphological structure.

A service gap may take the form of a polygon generated over a smart network coverage layer, and the service gap may indicate an area having poor coverage in the network. In some embodiments, a service gap is due to coverage overlap of two or more cells. According to the techniques described herein, an algorithm may generate service gaps for each band, this band-specific service gap generation may occur in periodic intervals, and the algorithm may provide optimization suggestions to improve coverage. In some embodiments, the system provides for the tracking of service gap improvements. An optimization solution may involve determining a recommended tilt using a predetermined tilt recommendation process. The predetermined tilt recommended process may, e.g., be based on one or more poor coverage areas or one or more service gaps.

The techniques described herein provide a system that may improve one or more of an improvement in user experience, tracking of one or more improvements to service gaps, providing optimization suggestions to improve service coverage, and enhancing the accuracy of a number of features including but not limited to tilt recommendations.

According to some embodiments, a candidate cell may be categorized into one or more predetermined types. In some embodiments, there may a best server plot type and a drive test type categorization for a candidate cell. The best server plot type and drive test type may respectively be referred to as "BSP type" and "DT type." If a candidate cell is categorized into a BSP type or a DT type, this particular candidate cell may a cell predicted to have poor coverage and thus may be eligible for E-Tilt recommendation. In some embodiments, a service gap generation process may generate a service gap adjacent to a candidate cell having poor coverage. In some embodiments, a candidate cell may satisfy the conditions that make a candidate cell a BSP type and satisfy the conditions that make a candidate cell a DT type. In instances in which a candidate cell satisfies both the BSP type conditions and the DT type conditions, the system may categorize the candidate cell as the BSP type. In some embodiments, the system may only check for DT type conditions if the candidate cell fails to satisfy the BSP type conditions.

In some embodiments, a tilt recommendation system may have one or more inputs. For example, a tilt recommendation system may use as inputs one or more of: a best server plot (BSP), geo-located data, or a performance monitor (PM) counter.

A BSP may be calculated for a cell or site using a prediction tool. The BSP may relate to a particular cell or site, and the cell or site may be a candidate cell or site. A planning tool may use physical information of an actual or planned cell or site and determine a predicted BSP of the actual or planned cell or site. The BSP may be, e.g., a service coverage area that a planned cell may provide. The BSP in conjunction with the planned cell/site may be used to make decisions on which cells should be implemented to provide improved coverage in particular areas. These techniques may be used to determine a best cell to provide coverage in a particular area. In some embodiments, the BSP is generated using planning samples and drive test samples. In some embodiments, there may be two data sets, e.g., BSP data and drive test data. The BSP data may include information related to BSP samples, and the drive test data may include information related to drive test samples. A cell, e.g., a candidate cell, may be associated with BSP samples and/or drive test samples. A number of BSP samples may be based on plan data, and the number of BSP samples may be fixed. BSP may have some samples from a first cell and other samples from a second cell. There may be multiple candidate cells adjacent to a particular service gap. For this particular service gap, there m In some embodiments, the drive test samples may be obtained in a drive test, which may consist of obtaining samples as a vehicle drives or travels within a predefined geographical area. The drive test samples may be obtained from one or a plurality of vehicles, and the vehicles used may be terrestrial and/or aerial vehicles. The drive test samples may be, e.g., samples of RF signals that may be geo-tagged or geo-located such that each sample is associated with a specific location. The drive test samples may be used to identify areas with no or low connectivity, handover issues, call drops, low throughputs, no data, etc. In some embodiments, the drive test samples may measure, e.g., one or more of Received Signal Strength Indicator(s) (RSSI), other measurements that measure a strength of a reference signal, Signal-to-Noise Ratio(s) (SINR), other measurements that compare a strength of a signal to background noise, Reference Signal Received Power (RSRP), other measurements that measure the power of the reference signal, etc.

Geo-located data may refer to actual or empirical data that may be obtained using a drive test tool. Geo-located data may include, e.g., net velocity. A device may be used to collect the geo-located data passively or actively, and the geo-located data may be data collected within a predetermined time frame. In one embodiment, the system may use data collected over a predetermined number of days, e.g., 7 days. In some embodiments, the system may use geo-located data collected within the past 7 days. As such, the geo-located data may be dynamic and/or neoteric.

A PM counter may be used to determine or track data. In some embodiments PM counter data includes key performance indicators (KPIs), and such KPIs may relate to one or more cells or sites, which may be actual or planned cells or sites. PM counter data may include but is not limited to a call-drop rate, Radio Resource Control (RRC) attempts, RRC establishment attempts, or channel quality information (CQI), e.g., a mean CQI.

Figure 5:
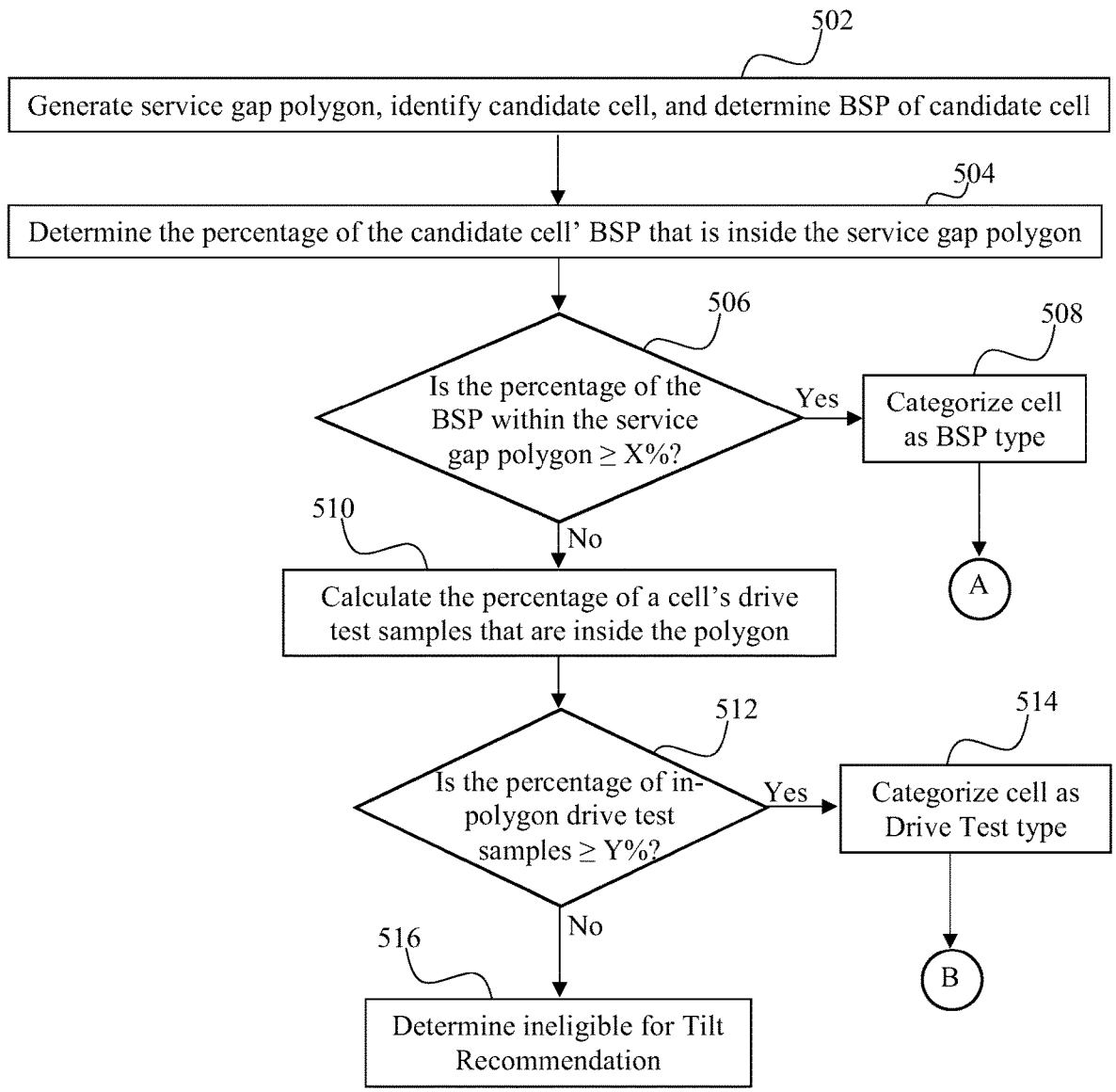
FIG. 5 is a flow diagram of a E-Tilt recommendation process, according to an example embodiment.
Figure 5:
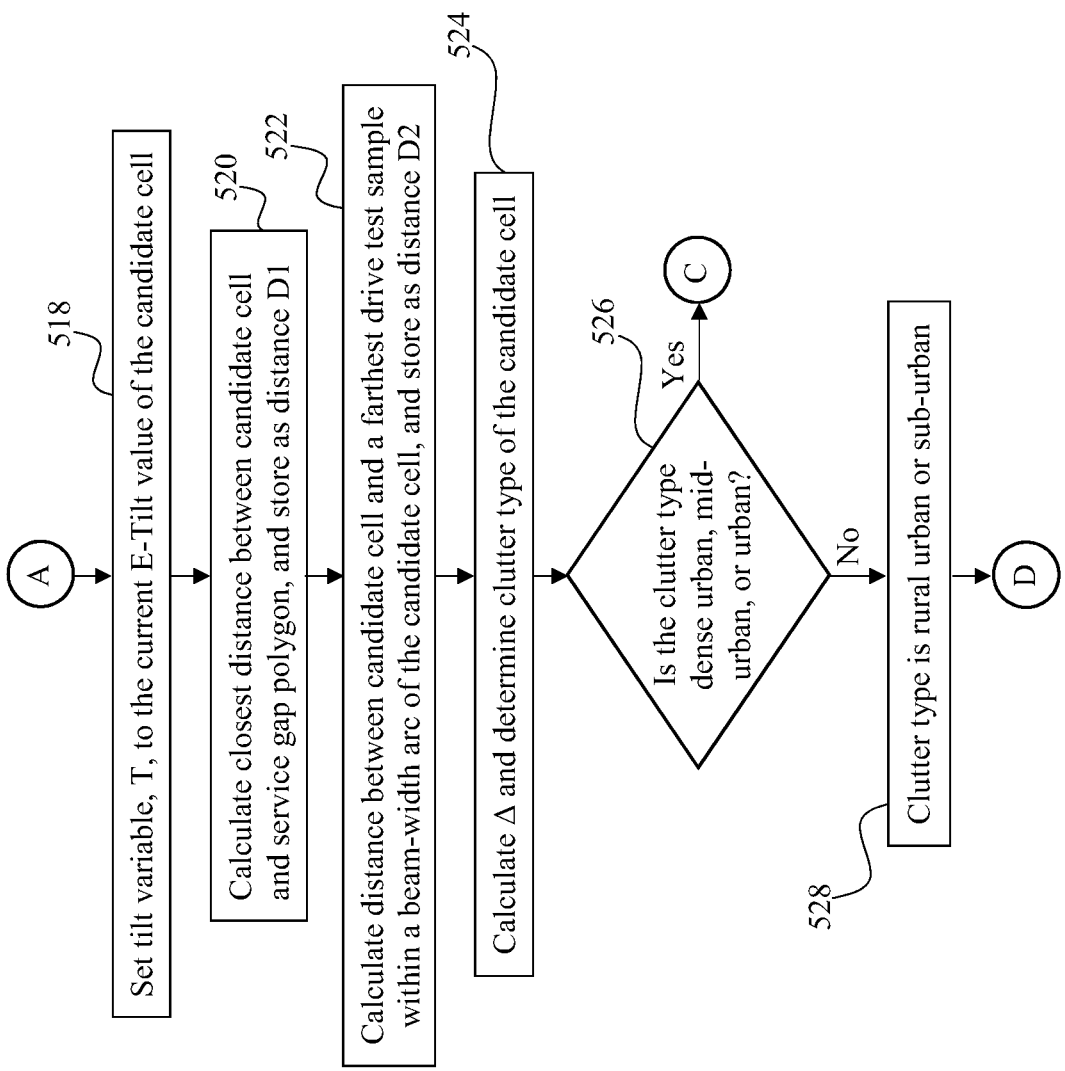
Figure 5:
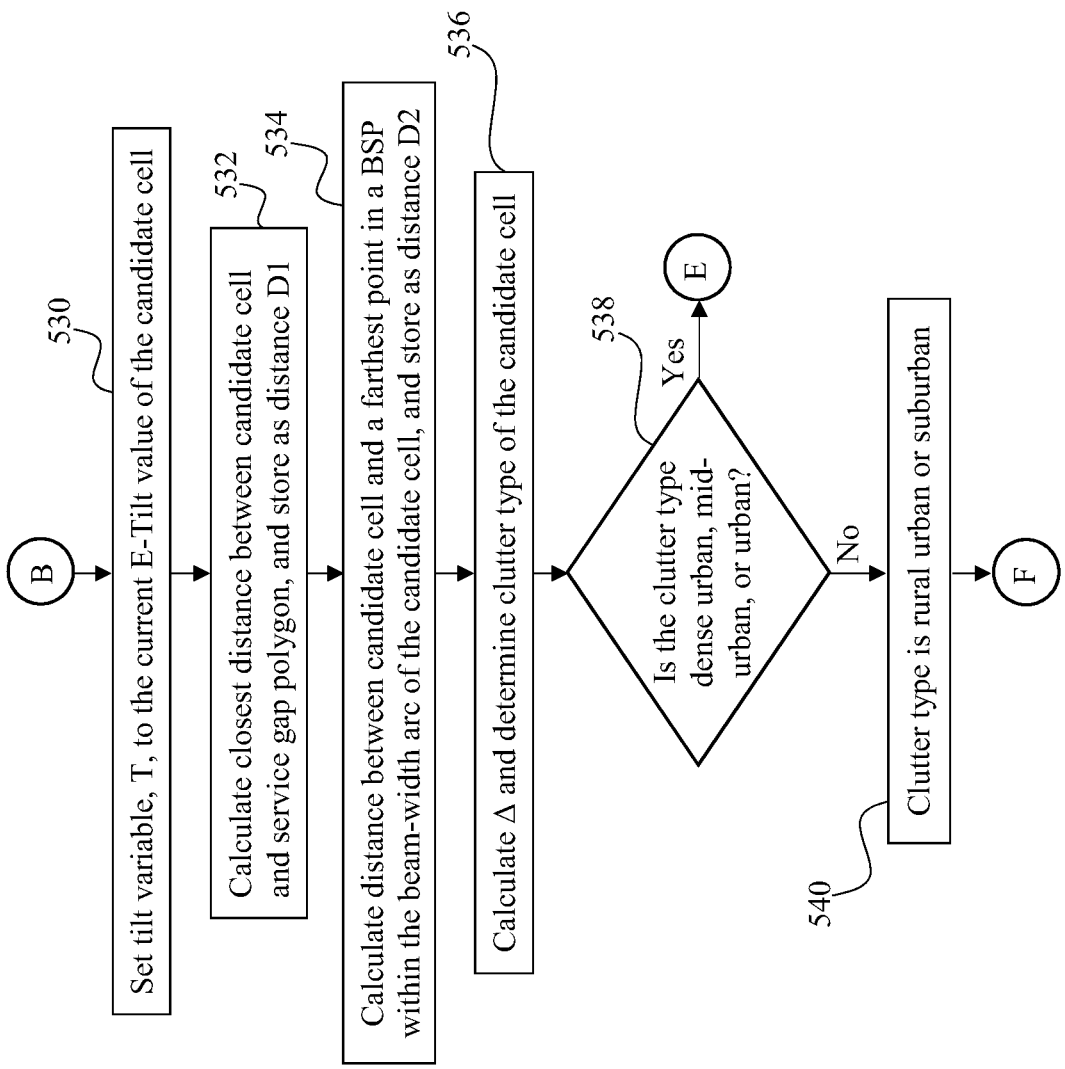
Figure 5:
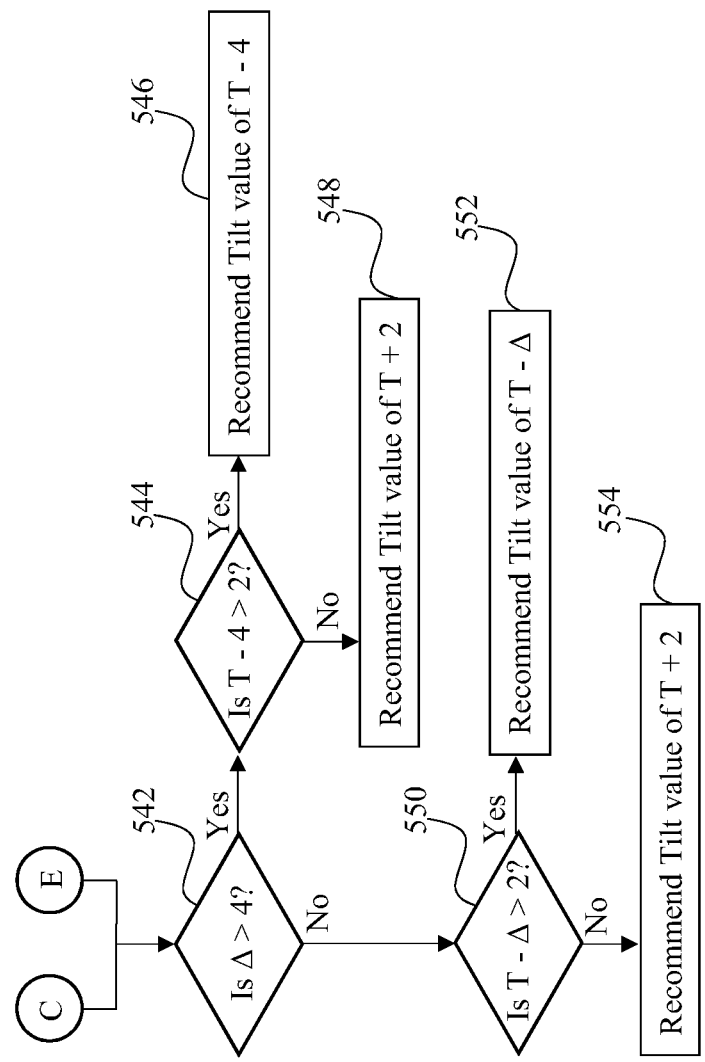
Figure 5:
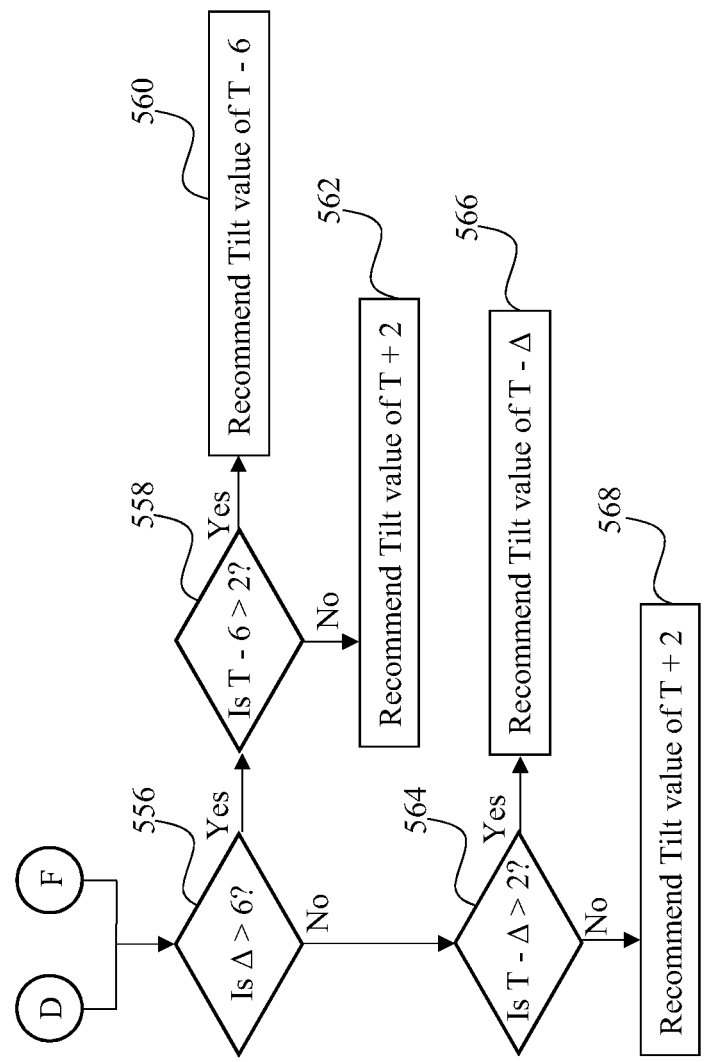

FIG. 5 is a flow diagram of a E-Tilt recommendation process. The process in FIG. 5 consists of a series of operations, which begin at operation 502 in which a service gap polygon is generated, a candidate cell is identified, and a BSP of the candidate cell is determined. Next, in operation 504, it is determined a percentage of the candidate cell's BSP that lies within the service gap polygon. In some embodiments, an area overlap between a BSP area and a service gap polygon area is determined and compared to the total area of the candidate cell's BSP. For example, the determined overlap area may be divided by the total area of the candidate cell's BSP and multiplied by 100 to calculate the percentage of the candidate cell's BSP that lies within the service gap polygon. In some embodiments, an amount of a candidate cell's BSP samples is compared to an amount of the candidate cell's total samples, which may include BSP samples and drive test samples. For example, a number of candidate cell's BSP samples may be divided by the total number of a candidate's samples and multiplied by 100 to calculate the percentage of the candidate cell's BSP that lies within the service gap polygon. The process then proceeds to operation 506.

At operation 506, a decision is made as to whether the percentage of the candidate cell's BSP that lies within the service gap polygon is greater than or equal to a first predetermined percentage (X %). In some embodiments, the first predetermined percentage, X %, is 10%. However, the first predetermined percentage, X %, may be any predetermined percentage. In some embodiments, in addition to or instead of comparing the percentage of the BSP within the service gap polygon to a predetermined percentage, other criteria may be used to make the decision at operation 506.

In some embodiments, if the percentage of the candidate cell's BSP that lies within the service gap polygon is greater than or equal to the first predetermined percentage (X %), the process proceeds to operation 508. At operation 508, the candidate cell is categorized as a BSP type, and the process proceeds to operation 518, which is further described below.

In some embodiments, if the percentage of the BSP that lies within the service gap polygon is not greater than or equal to the first predetermined percentage (X %), it is determined the percentage of the BSP that lies within the service gap polygon is less than the first predetermined percentage (X %), and the process proceeds to operation 510.

At operation 510, the system calculates a percentage of the candidate cell's drive test samples that lie within the service gap polygon. As noted above, each of a candidate cell's drive test samples may be associated with a particular spatial or geographical location. Additionally, the service gap polygon may be generated or overlaid on a particular geographical area. The system may compare the geographical locations of each of the candidate cell's drive test samples and make a determination as to whether each of the candidate cell's drive test samples is located within the geographical boundaries of the service gap polygon. After determining which of the candidate cell's drive test samples are inside the service gap polygon, the system can compute a percentage amount of the candidate cell's drive test samples within the service gap polygon out of the total number of the candidate cell's drive test samples. The process then proceeds to operation 512.

At operation 512, a decision is made as to whether the percentage of the candidate cell's drive test samples that lie within the service gap polygon is greater than or equal to a second predetermined percentage, Y %. In some embodiments, the second predetermined percentage, Y %, is 25%. However, the second predetermined percentage, Y %, may be any predetermined percentage. In some embodiments, in addition to or instead of comparing the percentage of the candidate cell's drive test samples that lie within the service gap polygon to a predetermined percentage, other criteria may be used to make the decision at operation 512.

If the percentage of the candidate cell's drive test samples that lie within the service gap polygon is greater than or equal to the second predetermined percentage, Y %, the process proceeds to operation 514, at which the candidate cell is categorized as a DT type. After operation 514, the process proceeds to operation 530, which is further described below. If the percentage of the candidate cell's drive test samples that lie within the service gap polygon is not greater than or equal to the second predetermined percentage, Y %, the system determines the percentage of the candidate cell's drive test samples that lie within the service gap polygon is less than the second predetermined percentage, Y %, and the process proceeds to operation 516. At operation 516, the system may determine that the candidate cell is ineligible for tilt recommendation. At operation 516, the system may generate and display contents of a report indicating the candidate cell is ineligible for tilt recommendation, and the system may further proceed to perform other operations that may mitigate or eliminate the service gap of interest using other service gap mitigation/elimination techniques.

As noted above, if the system proceeds to operation 508 at which the candidate cell is categorized as a BSP type, the system next proceeds to operation 518. At operation 518, the tilt variable, T, is set to the current E-Tilt value of the candidate cell, that is, the system makes T equal to the current E-tilt value of the candidate cell. Next, the system proceeds to operation 520 at which a closest distance between the candidate cell and the service gap polygon is calculated and stored as a first distance variable, D1. The system then proceeds to operation 522 in which a distance between the candidate cell and a farthest drive test sample within a beam-width arc of the candidate cell is calculated and stored as a second distance variable, D2. The farthest drive test sample within the beam-width arc may be associated with a maximum distance that a cell site may communicate. Next, the system proceeds to operation 524 at which Delta, Δ, is calculated and a clutter type of the candidate cell is determined. In some embodiments, formula 1 below is used to calculate Delta, Δ.

$$\Delta = \tan^{-1}((H-2)/D1) - \tan^{-1}((H-2)/D2) \tag{1}$$

In formula (1), the variable H is the candidate cell's antenna height, which may be a height above mean seal level (AMSL). After Delta, Δ, is calculated and a clutter type of the candidate cell is determined, the process proceeds to operation 526. At operation 526, the system determines whether the clutter type is one of dense urban, mid-urban, or urban. If it is determined the clutter type is either dense urban, mid-urban, or urban, the system proceeds to operation 542, which is further described below. If it is determined the clutter type is not dense urban, mid-urban, or urban, the system proceeds to operation 528, at which the clutter type is determined to be either rural urban or suburban, and the system proceeds to operation 556, which is further discussed below.

As noted above, if the system proceeds to operation 514 at which the candidate cell is categorized as a DT type, the system next proceeds to operation 530. At operation 530, the tilt variable, T, is set to the current E-Tilt value of the candidate cell, that is, the system makes T equal to the current E-tilt value of the candidate cell. Next, the system proceeds to operation 532 at which a closest distance between the candidate cell and the service gap polygon is calculated and stored as the first distance variable, D1. The system then proceeds to operation 534 in which a distance between the candidate cell and a farthest point in a BSP within the beam-width arc of the cell is calculated and stored as a second distance variable, D2. Next, the system proceeds to operation 536 at which Delta, Δ, is calculated and a clutter type of the candidate cell is determined. In some embodiments, formula 1 above is used to calculate Delta, Δ.

As noted above, the calculation of Delta, Δ may use the candidate cell's antenna height, H, which may be the AMSL height. After Delta, Δ, is calculated and a clutter type of the candidate cell is determined, the process proceeds to operation 538. At operation 538, the system determines whether the clutter type is one of dense urban, mid-urban, or urban. If it is determined the clutter type is either dense urban, mid-urban, or urban, the system proceeds to operation 542, which is further described below. If it is determined the clutter type is not dense urban, mid-urban, or urban, the system proceeds to operation 540, at which the clutter type is determined to be either rural urban or suburban, and the system proceeds to operation 556, which is further discussed below.

As noted above, if the clutter type is determined to be either dense urban, mid-urban, or urban, the system proceeds to operation 542. At operation 542, the calculated Delta, Δ, is compared to a first predetermined value, which may, e.g., 4. If the Delta, Δ, is greater than the first predetermined number, the process may proceed to operation 544. At operation 544, a quantity obtained by subtracting the first predetermined value (e.g., 4) from the tilt variable, T, is obtained then compared to a second predetermined value, which may be, e.g., 2. If the quantity (i.e., T minus the first predetermined value) is greater than the second predetermined value, the process proceeds to operation 546. In one embodiment, if T minus 4 is greater than 2, the process proceeds to operation 546. At operation 546, the system may determine a recommended tilt value is equal to the tilt variable, T, minus the first predetermined value. For example, at operation 546, the system may determine the recommended tilt value is equal to T minus 4.

If the quantity of the tilt variable, T, minus the first predetermined value (e.g., 4) is less than or equal to the second predetermined value, the process proceeds to operation 548. In one embodiment, if T minus 4 is less than or equal to 2, the process proceeds to operation 548. At operation 548, the system may determine the recommended tilt value is equal to the tilt variable, T, plus the second predetermined value. For example, at operation 546, the system may determine the recommended tilt value is equal to T plus 2.

If at operation 542, the calculated Delta, Δ, determined to be less than or equal to the first predetermined number (e.g., 4), the process may proceed to operation 550. At operation 550, a quantity obtained by subtracting the Delta, Δ, from the tilt variable, T, is obtained then compared to the second predetermined value (e.g., 2). If the quantity (i.e., T minus Δ) is greater than the second predetermined value (e.g., 2), the process proceeds to operation 552. At operation 552, the system may determine the recommended tilt value is equal to T minus Δ. If at operation 550, the quantity of T minus Δ is less than or equal to the second predetermined value (e.g., 2), the process proceeds to operation 548. In one embodiment, if T minus Δ is less than or equal to 2, the process proceeds to operation 554. At operation 554, the system may determine the recommended tilt value is equal to the tilt variable, T, plus the second predetermined value (e.g., 2).

As noted above, if the clutter type is determined to be either rural urban or suburban, the system proceeds to operation 556. At operation 556, the calculated Delta, Δ, is compared to a third predetermined value, which may, e.g., 6. If the Delta, Δ, is greater than the third predetermined number, the process may proceed to operation 558. At operation 558, a quantity obtained by subtracting the third predetermined value (e.g., 6) from the tilt variable, T, is obtained then compared to the second predetermined value (e.g., 2). If the quantity (i.e., T minus the third predetermined value) is greater than the second predetermined value, the process proceeds to operation 560. In one embodiment, if T minus 6 is greater than 2, the process proceeds to operation 560. At operation 560, the system may determine a recommended tilt value is equal to the tilt variable, T, minus the third predetermined value. For example, at operation 560, the system may determine the recommended tilt value is equal to T minus 6.

If the quantity of the tilt variable, T, minus the third predetermined value (e.g., 6) is less than or equal to the second predetermined value, the process proceeds to operation 562. In one embodiment, if T minus 6 is less than or equal to 2, the process proceeds to operation 562. At operation 562, the system may determine the recommended tilt value is equal to the tilt variable, T, plus the second predetermined value. For example, at operation 562, the system may determine the recommended tilt value is equal to T plus 2.

If at operation 556, the calculated Delta, Δ, determined to be less than or equal to the third predetermined number (e.g., 6), the process may proceed to operation 564. At operation 564, a quantity obtained by subtracting the Delta, Δ, from the tilt variable, T, is obtained then compared to the second predetermined value (e.g., 2). If the quantity (i.e., T minus Δ) is greater than the second predetermined value (e.g., 2), the process proceeds to operation 566. At operation 566, the system may determine the recommended tilt value is equal to T minus Δ. If at operation 564, the quantity of T minus Δ is determined to be less than or equal to the second predetermined value (e.g., 2), the process proceeds to operation 568. In one embodiment, if T minus Δ is less than or equal to 2, the process proceeds to operation 568. At operation 568, the system may determine the recommended tilt value is equal to the tilt variable, T, plus the second predetermined value (e.g., 2).

While the first, second, and third predetermined values may be values of 4, 2, and 6, respectively, the first, second, and third predetermined values are not necessarily limited thereto and may be any value(s). The flow diagram shown in FIG. 5 is one exemplary E-Tilt recommendation method or algorithm that takes into account various parameters, e.g., morphology, BSP area relative to an area of a service gap polygon, a number of drive test samples relative to the service gap polygon area, and a candidate cell's antenna height.

In some embodiments, the result of the E-Tilt recommendation process is a recommended E-Tilt. The recommended E-Tilt may be provided to one or more members, e.g., a design engineer, of an organization, and the one or more members of the organization may use the recommended E-Tilt for decision making related to actual E-Tilt implementation. In some embodiments the organization may be an operator of cell sites. Accordingly, the recommended E-Tilt may or may not be an E-Tilt used in an actual E-Tilt implementation, and the one or more organization members may modify or alter the recommended E-Tilt in actual implementation based on a variety of factors such as existing infrastructure, topography, or other factors. When the E-Tilt is modified or altered, e.g., per the recommended E-Tilt value, the service gap may be mitigated or eliminated thereby improving network coverage and service.

Figure 6:
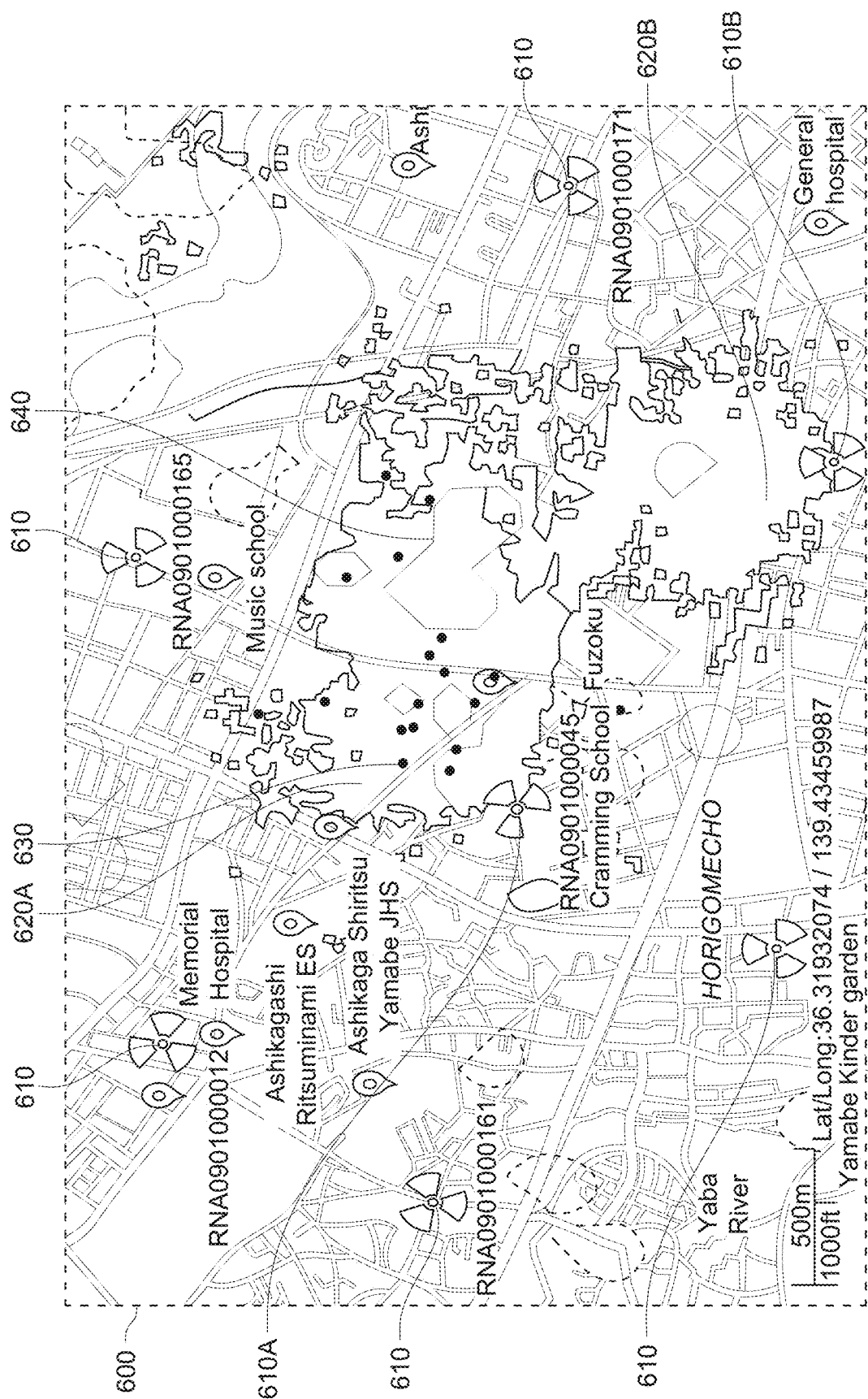
FIG. 6 shows a candidate cell on a map, which also includes a best server plot, a plurality of drive test samples, and a service gap polygon, according to an example embodiment.

FIG. 6 shows actual and/or candidate cells 610 on a map 600, which also includes a BSP 620, a plurality of drive test samples 630, and a service gap polygon 640. The small black dots shown in the map 600 may be drive test samples 630. The drive test samples 630 may or may not be in the BSP 620; and the drive test samples 630 may or may not be in the service gap polygon 640.

FIG. 6 shows two BSPs, there is a first BSP 620A shown for cell 610A, and there is a second BSP 620B for cell 610B. The service gap polygon 640 has a substantial overlap with the first BSP 620A, and thus the percentage of the cell 610A's BSP 620A that lies within the service gap polygon 640 is greater than 10% and cell 610A may be categorized in a BSP type candidate cell. Therefore, an e-tilt recommendation algorithm may be used to determine a recommended e-tilt modification for the tilt of cell 610A.

FIG. 7A shows a graphical user interface (GUI) 700, which indicates a plurality of service gap properties. In some embodiments, one or more of a service gap ID 702, a service gap area 704, a service gap morphology 706, a number of optimizations 708, a polygon priority 710, an average RSRP 712 (e.g., as measured in dBm), and an area covered by candidate cells 714 may displayed in first GUI 700. In the embodiment shown in FIG. 7A, information related to one service gap is shown, but the GUI 700 is not necessarily limited thereto and may show information related to a plurality of service gaps. In the embodiment shown in FIG. 7A, the service gap ID 702 is TC5550D1_29110, the service gap area 704 is 115697.0, the service gap morphology 706 is SubUrban, the number of optimizations 708 is 2, the polygon priority 710 is P2, the average RSRP 712 is −105.50 dBm, and the area covered by candidate cells 714 is 98.45 km. Of course, the values for these fields are merely exemplary and may be specific to one or more particular service gaps of interest.

The service gap ID 702, service gap area 704, service gap morphology 706, number of optimizations 708, polygon priority 710, average RSRP 712, and area covered by candidate cells 714 may be associated with a selection of "Polygon Information" option 720 from a dropdown 730. The dropdown 730 may accessed to select another option such as a "System Recommendation" option 722 shown in FIG. 7B.

As shown in FIG. 7B, if a System Recommendation option 722 is selected, the GUI 700 may show data related to specific cells and proposed E-Tilt associated with such specific cells. For example, the GUI 700 may show a Cell Name 716, a Selection Criteria 717, a Current E-Tilt 718, and a Proposed E-Tilt 719. As shown in FIG. 7B, information related to a first cell 742 and a second cell 744 is shown; however, information related to any number of cells may be shown. As shown in FIG. 7B, the first cell 742 has a cell name 716 of RNA0901000070-10, a selection criteria 717 of Best Server Plot, a Current E-Tilt 718 of 4, and a proposed E-Tilt 719 of 3; and the second cell 744 has a cell name 716 of RNA0901000045-10, a selection criteria 717 of Best Server Plot, a Current E-Tilt 718 of 4, and a proposed E-Tilt 719 of 3. The selection criteria 717 may refer to the categorization of the cell either as a BSP type or a DT type.

The E-Tilt recommendation process may be repeated for a plurality of candidate cells and/or service gaps in a network, and thus the techniques herein provide an efficient and cost-effective way to producing E-Tilt recommendations for numerous candidate cells and/or service gaps in a network. Such recommendations enable service providers to quickly and cost-effectively address, e.g., mitigate or eliminate, service gaps in a network to therefore provide higher-quality service for their customers.

Figure 8:
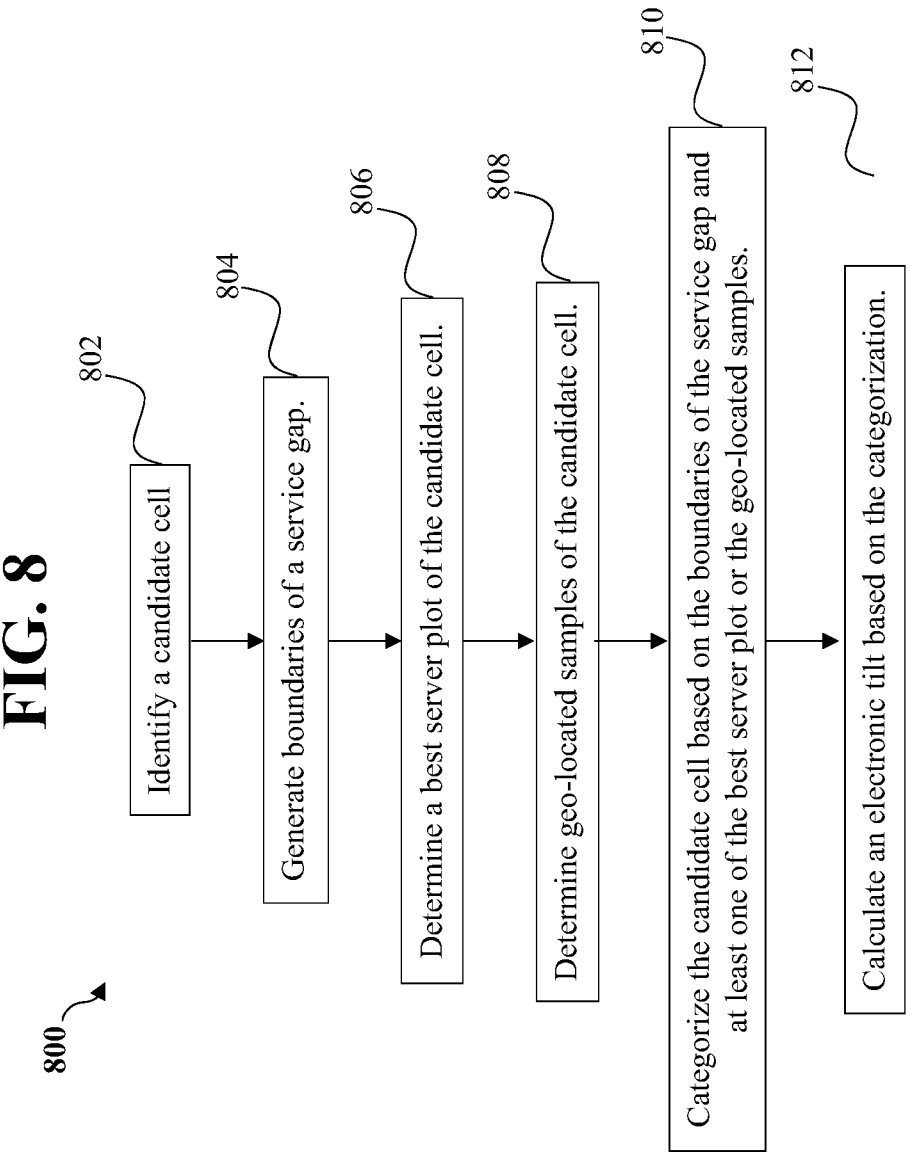
FIG. 8 is a flowchart of a method of mitigating or eliminating service gaps via E-Tilt recommendation, according to an example embodiment

FIG. 8 is a flowchart of a method of mitigating or eliminating service gaps via an electronic tilt recommendation, according to an example embodiment. In operation 802, a candidate cell is identified. In operation 804, boundaries of a service gap are generated. In operation 806, a best server plot of the candidate cell is determined. In operation 808, geo-located samples of the candidate cell are determined. In operation 810, the candidate cell is categorized based on the boundaries of the service gap and at least one of the best server plot or the geo-located samples; and in operation 812, an electronic tilt is calculated based on the categorization.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for service gap mitigation via tilt recommendation, the method comprising:
    identifying a candidate cell;
    generating boundaries of a service gap, the generated boundaries defining a shape of an identified geographic location of the service gap;
    determining a best server plot of the candidate cell, the best server plot being a planned coverage area of the candidate cell;
    determining geo-located samples of the candidate cell;
    categorizing the candidate cell based on an overlap between the identified geographic location of the service gap and at least one of the best server plot or locations of the geo-located samples; and
    calculating an electronic tilt based on the categorization, wherein the categorizing the candidate cell based on the overlap between the identified geographic location of the service gap and at least one of the best server plot or locations of the geo-located samples further comprises:
        determining a first percentage, the first percentage being a percentage of the best server plot that lies within the boundaries of the service gap; and
        determining the first percentage is greater than or equal to a first threshold percentage.

2. The method of claim 1, wherein the categorizing the candidate cell based on the boundaries of the service gap and at least one of the best server plot or the geo-located samples further comprises:
    determining a second percentage, the second percentage being the percentage of geo-located samples that lie within the boundaries of the service gap; and
    determining the second percentage is greater than or equal to a second threshold percentage.

3. The method of claim 1, wherein the categorizing the candidate cell based on the boundaries of the service gap and at least one of the best server plot or the geo-located samples further comprises:
    categorizing the candidate cell as a best server plot type when the first percentage is greater than or equal to the first threshold percentage.

4. The method of claim 2, wherein the categorizing the candidate cell based on the boundaries of the service gap and at least one of the best server plot or the geo-located samples further comprises:
    categorizing the candidate cell as a geo-located sample type when the second percentage is greater than or equal to the second threshold percentage.

5. The method of claim 1, wherein the calculating the electronic tilt based on the categorization further comprises:
    calculating the electronic tilt using a first algorithm if a clutter type of the candidate cell is a first clutter type; and
    calculating the electronic tilt using a second algorithm if the clutter type of the candidate cell is a second clutter type.

6. The method of claim 5, wherein:
    the first clutter type is either dense urban, mid-urban, or urban; and
    the second clutter type is either rural urban or sub-urban.

7. An information processing system for service gap mitigation via tilt recommendation, the information processing system comprising:
    at least one memory configured to store computer program code; and
    at least one processor configured to access said at least one memory and operate as instructed by said computer program code, said computer program code including:
        identifying code configured to cause at least one of the at least one processor to identify a candidate cell,
        generating code configured to cause at least one of the at least one processor to generate boundaries of a service gap, the generated boundaries defining a shape of an identified geographic location of the service gap,
        first determining code configured to cause at least one of the at least one processor to determine a best server plot of the candidate cell, the best server plot being a planned coverage area of the candidate cell,
        second determining code configured to cause at least one of the at least one processor to determine geo-located samples of the candidate cell,
        categorizing code configured to cause at least one of the at least one processor to categorize the candidate cell based on an overlap between the identified geographic location of the service gap and at least one of the best server plot or locations of the geo-located samples, and calculating code configured to cause at least one of the at least one processor to calculate an electronic tilt based on the categorization, wherein said computer program code further comprises:

third determining code configured to cause at least one of the at least one processor to determine a first percentage, the first percentage being a percentage of the best server plot that lies within the boundaries of the service gap; and fourth determining code configured to cause at least one of the at least one processor to determine the first percentage is greater than or equal to a first threshold percentage.

8. The information processing system of claim 7, further comprising:

third determining code configured to cause at least one of the at least one processor to determine a second percentage, the second percentage being the percentage of geo-located samples that lie within the boundaries of the service gap; and fourth determining code configured to cause at least one of the at least one processor to determine the second percentage is greater than or equal to a second threshold percentage.

9. The information processing system of claim 7, wherein the categorizing code is further configured to cause at least one of the at least one processor to categorize the candidate cell as a best server plot type when the first percentage is greater than or equal to the first threshold percentage.

10. The information processing system of claim 8, wherein the categorizing code is further configured to cause at least one of the at least one processor to categorize the candidate cell as a geo-located sample type when the second percentage is greater than or equal to the second threshold percentage.

11. The information processing system of claim 7, wherein the calculating code is further configured to cause at least one of the at least one processor to:

calculate the electronic tilt using a first algorithm if a clutter type of the candidate cell is a first clutter type; and calculate the electronic tilt using a second algorithm if the clutter type of the candidate cell is a second clutter type.

12. The information processing system of claim 11, wherein:

the first clutter type is either dense urban, mid-urban, or urban; and the second clutter type is either rural urban or sub-urban.

13. A non-transitory computer-readable recording medium having recorded thereon a program for performing a method of service gap mitigation via tilt recommendation, the program configured to cause a computer to:

identify a candidate cell;

generate boundaries of a service gap, the generated boundaries defining a shape of an identified geographic location of the service gap;

determine a best server plot of the candidate cell, the best server plot being a planned coverage area of the candidate cell;

determine geo-located samples of the candidate cell;

categorize the candidate cell based on an overlap between the identified geographic location of the service gap and at least one of the best server plot or locations of the geo-located samples; and calculate an electronic tilt based on the categorization, wherein the program is further configured to cause the computer to:

determine a first percentage, the first percentage being a percentage of the best server plot that lies within the boundaries of the service gap; and determine the first percentage is greater than or equal to a first threshold percentage.

14. The non-transitory computer-readable recording medium according to claim 13, wherein the program is further configured to cause the computer to:

determine a second percentage, the second percentage being the percentage of geo-located samples that lie within the boundaries of the service gap; and determine the second percentage is greater than or equal to a second threshold percentage.

15. The non-transitory computer-readable recording medium according to claim 13, wherein the program is further configured to cause the computer to:

categorize the candidate cell as a best server plot type when the first percentage is greater than or equal to the first threshold percentage.

16. The non-transitory computer-readable recording medium according to claim 14, wherein the program is further configured to cause the computer to:

categorize the candidate cell as a geo-located sample type when the second percentage is greater than or equal to the second threshold percentage.

17. The non-transitory computer-readable recording medium according to claim 13, wherein the program is further configured to cause the computer to:

calculate the electronic tilt using a first algorithm if a clutter type of the candidate cell is a first clutter type; and calculate the electronic tilt using a second algorithm if the clutter type of the candidate cell is a second clutter type.

* * * * *